US008131678B1

United States Patent
Moore et al.

(12) United States Patent
(10) Patent No.: US 8,131,678 B1
(45) Date of Patent: Mar. 6, 2012

(54) BROADCAST MESSAGING SYSTEM, APPARATUS AND METHOD FOR MAINTAINING CALL LIST CURRENCY

(75) Inventors: Joe Harley Moore, Swansea, IL (US); John William Lindemann, III, St. Louis, MO (US); Aida Hadzisabic, St. Louis, MO (US)

(73) Assignee: GroupCast, LLC, St. Louis, MO (US)

( * ) Notice: Subject to any disclaimer, the term of this patent is extended or adjusted under 35 U.S.C. 154(b) by 302 days.

(21) Appl. No.: 12/627,845

(22) Filed: Nov. 30, 2009

(51) Int. Cl.
*G06F 17/30* (2006.01)
*G06F 7/00* (2006.01)

(52) U.S. Cl. ........................... 707/638; 707/802

(58) Field of Classification Search .................. 707/638, 707/802
See application file for complete search history.

(56) References Cited

U.S. PATENT DOCUMENTS

| | | | |
|---|---|---|---|
| 5,260,986 A | | 11/1993 | Pershan |
| 5,745,481 A | * | 4/1998 | Phillips et al. ................. 370/313 |
| 5,923,733 A | | 7/1999 | Binns et al. |
| 6,335,927 B1 | * | 1/2002 | Elliott et al. ................... 370/352 |
| 6,424,711 B1 | * | 7/2002 | Bayless et al. ........... 379/355.09 |
| 6,463,462 B1 | | 10/2002 | Smith et al. |
| 6,895,240 B2 | | 5/2005 | Laursen et al. |
| 7,130,389 B1 | | 10/2006 | Rodkey et al. |
| 7,266,508 B1 | | 9/2007 | Owen et al. |
| 2003/0142809 A1 | | 7/2003 | Coffey |
| 2003/0191687 A1 | | 10/2003 | Pavone |
| 2007/0204078 A1 | * | 8/2007 | Boccon-Gibod et al. ....... 710/54 |
| 2008/0143548 A1 | | 6/2008 | Grimmelmann et al. |
| 2009/0060149 A1 | | 3/2009 | Pavelko et al. |

* cited by examiner

*Primary Examiner* — Kuen Lu
(74) *Attorney, Agent, or Firm* — Robert C. Haldiman; Husch Blackwell LLP (57) ABSTRACT

In a broadcast messaging system, a synchronization and update apparatus updates the content of a call list stored in a first database in a first format and a first configuration without upload instructions by a user of a user processor and without accessing said first database by the user of the second processor. The first database is in operative communication with a broadcast server. The broadcast server is programmed to broadcast a message through a communications network to a plurality of message receivers on the call list. The user processor is in operative communication with broadcast server, the user processor is programmed to update the call list in said first database from updated call list content in a second database at the user processor. The call list in said second database may be in a second configuration and either in the first format or a second format. The updating is executable automatically and repeatedly after only entry of at least one configuration instruction for at least one call list column. After said configuration instruction, changes made to the content of the call list in the second database are made in the call list in the first database at the broadcast server.

19 Claims, 11 Drawing Sheets

| A 104 | B 102 | C 106 | D | E | F | G | H | I | J | K | L | M |
|---|---|---|---|---|---|---|---|---|---|---|---|---|
| LAST | FIRST | PRIMARY PHONE | ALT. PHONE 1 | ALT. PHONE 2 | EMER. PHONE | EXT. | GRADE | ACTIVITIES | HOMEROOM | BUS # | CAMPUS | |
| XXXXXX | EMMA | 573-555-XXXX | (573)555-XXXX | | 636555XXXX | 28 | 7 | GLEE CLUB | KRABAPPLE | 4 | ELEMENTARY | |
| XXXXXX | ERIN | 573-555-XXXX | | 108 | | | 8 | | | 7 | ELEMENTARY | |
| XXXXXX | MAX | 573-555-XXXX | (314)555-XXXX | | 636555XXXX | | 110 3 | 112 | | 3 | ELEMENTARY | |
| XXXXXX | DEREK | 636-555-XXXX | (636)555-XXXX | (636)555-XXXX | | | 3 | | | 1 | ELEMENTARY | |
| XXXXXX | OLIVE | 314-555-XXXX | 555-XXXX | | 314555XXXX | | 9 | PFA | PETERS | 30 | HIGH | |
| XXXXXX | WILBUR | 314-555-XXXX | (314)555-XXXX | | 314555XXXX | 9 | 3 | | | 30 | ELEMENTARY | |
| XXXXXX | JOEL | 636-555-XXXX | (573)555-XXXX | (636)555-XXXX | 636555XXXX | 5 | 9 | SOFTBALL BAND | KOTTER | 41 | HIGH | |
| XXXXXX | ALBERT | 573-555-XXXX | | | 573555XXXX | 2865 | 12 | | BEARDSLEY | 1 | HIGH | |
| XXXXXX | SYDNEY | 573-555-XXXX | (573)555-XXXX | | 573555XXXX | 13 | 7 | BASKETBALL | KRABAPPLE | 4 | MIDDLE | |
| XXXXXX | IAN | 573-555-XXXX | (636)555-XXXX | (573)555-XXXX | | | 7 | | WALTERS | 1 | MIDDLE | |
| XXXXXX | ELIZABETH | 573-555-XXXX | (636)555-XXXX | | | | 1 | | | 8 | ELEMENTARY | |
| XXXXXX | CALEB | 573-555-XXXX | (314)555-XXXX | | 314555XXXX | | 1 | | | 8 | ELEMENTARY | |
| XXXXXX | THOMAS | 314-555-XXXX | (573)555-XXXX | | 573555XXXX | 2369 | 10 | DEBATE ART | RAWLS | 20 | HIGH | |
| XXXXXX | ANITA | 573-555-XXXX | (573)555-XXXX | | | | 10 | DEBATE | KOTTER | 20 | HIGH | |
| XXXXXX | HENSLEY | 573-555-XXXX | (573)555-XXXX | (573)555-XXXX | 573555XXXX | | 7 | BAND CHOIR | KRABAPPLE | 1 | MIDDLE | |
| XXXXXX | HENRY | 573-555-XXXX | (314)555-XXXX | | 314555XXXX | 4 | 11 | ARCHEOLOGY | KOTTER | 1 | MIDDLE | |
| XXXXXX | SPIKE | 314-555-XXXX | (636)555-XXXX | | | | 9 | CHOIR SOCCER | PETERS | 41 | MIDDLE | |
| XXXXXX | OLIVIA | 636-555-XXXX | (573)555-XXXX | | 573555XXXX | | 3 | | | 13 | ELEMENTARY | |
| XXXXXX | GRACE | 573-555-XXXX | (573)555-XXXX | | 636555XXXX | | 1 | | | 1 | ELEMENTARY | |
| XXXXXX | SARAH | 636-555-XXXX | (636)555-XXXX | | 314555XXXX | 221 | 8 | BAND SOCCER | CARLOS | 3 | MIDDLE | |
| XXXXXX | JOSEPH | 636-555-XXXX | (314)555-XXXX | | 636555XXXX | | 7 | CHOIR | HIGGINS | 1 | MIDDLE | |
| XXXXXX | AMBER | 636-555-XXXX | (636)555-XXXX | (636)555-XXXX | | | 6 | ART | CHIANG | 23 | MIDDLE | |
| XXXXXX | GABRIEL | 573-555-XXXX | (573)555-XXXX | | | | 4 | | | 23 | ELEMENTARY | |
| XXXXXX | ANNA | 636-555-XXXX | (314)555-XXXX | | | 330 | 8 | CHOIR | HIGGINS | 2 | MIDDLE | |
| XXXXXX | ZOE | 636-555-XXXX | | | 314555XXXX | | 9 | BASEBALL | HIGGINS | 1 | MIDDLE | |
| XXXXXX | CHRIS | 573-555-XXXX | | | | | 12 | BASEBALL | RAWLS | 30 | HIGH | |
| XXXXXX | CHRISTOPHER | 314-555-XXXX | (573)555-XXXX | 100 | 573555XXXX | | 12 | DEBATE PFA | BUJOR | 20 | HIGH | |
| XXXXXX | SISSY | 314-555-XXXX | (314)555-XXXX | | 314555XXXX | | 10 | SOFTBALL | | | HIGH | |
| XXXXXX | TAMBORA | 636-555-XXXX | (636)555-XXXX | | 573555XXXX | | 10 | THEATER | BEARDSLEY | 41 | MIDDLE | |
| XXXXXX | EVEREST | 636-555-XXXX | (573)555-XXXX | | 573555XXXX | | 7 | SOFTBALL | BEARDSLEY | 41 | MIDDLE | |
| XXXXXX | STEPHANIE | 573-555-XXXX | (573)555-XXXX | | 573555XXXX | | 8 | | CARLOS | 2 | ELEMENTARY | |
| XXXXXX | ABBIGAL | 573-555-XXXX | (573)555-XXXX | (314)555-XXXX | | | 4 | | | 3 | ELEMENTARY | |
| XXXXXX | WHITNEY | 573-555-XXXX | (573)555-XXXX | | 573555XXXX | | 8 | | KRABAPPLE | 4 | MIDDLE | |
| XXXXXX | MALCOLM | 314-555-XXXX | (314)555-XXXX | | 314555XXXX | | 11 | BASKETBALL | BUJOR | 51 | HIGH | |
| XXXXXX | ZACHARY | 573-555-XXXX | (636)555-XXXX | | 636555XXXX | | 7 | BAND | CARLOS | 1 | MIDDLE | |
| XXXXXX | DANIEL | 573-555-XXXX | | | | | 6 | CHOIR | CHIANG | 3 | MIDDLE | |
| XXXXXX | MEGAN | 573-555-XXXX | (573)555-XXXX | | | | 8 | BASKETBALL BAND | CARLOS | 1 | MIDDLE | |
| XXXXXX | BENJAMIN | 314-555-XXXX | (636)555-XXXX | | 636555XXXX | 38 | 11 | BAND SOCCER | BUJOR | 30 | HIGH | |

SchoolReach
ONE CALL CALLS THEM ALL

MEMBER'S AREA    SITE AREAS    HELP    LOG-OUT

QUICK LINKS
- LIST CENTER
- MESSAGE CENTER
- LAUNCH CENTER
- ONLINE HELP
- UPDATE PAGE

LAUNCH CENTER

YOU'RE NOW IN THE LAUNCH CENTER

THIS IS WHERE YOU CAN LAUNCH BROADCASTS. YOU CAN SET THEM UP BY CHOOSING THE LIST(S) TO BE SENT, THE MESSAGE(S) TO BE PLAYED, AND ANY OTHER BATCH OPERATIONS. THEN CHOOSE EITHER "LAUNCH NOW" OR "SCHEDULE LAUNCH" BUTTON TO SET WHEN THE BROADCAST WILL BE LAUNCHED. THEN JUST CHECK THE MEMBERSHIP AREA DURING YOUR BROADCAST TO TRACK IT'S PROGRESS. IT'S THAT EASY.

USED ADVANCED VIEW ☐

1) CHOOSE LIST(S)

AVAILABLE LISTS — 206 — SELECTED FOR BROADCAST

| 1-STUDENT PRIMARY PHONE |
| 2-STUDENT SECONDARY PHONE |
| 10-SCHOOLREACH CONTACTS |

202

>>
<<

204

2) SELECT MESSAGE
LIVE MESSAGES    NO MESSAGE SELECTED ▽
MACHINE MESSAGES    SAME AS LIVE MESSAGE ▽

3) SELECT BROADCAST DATE/TIME

I WOULD LIKE TO LAUNCH IMMEDIATELY ▽

9/10/2009 ☐
7 ▽  53 ▽  PM ▽

NEXT →

BROADCAST MESSAGING SYSTEM, APPARATUS AND METHOD FOR MAINTAINING CALL LIST CURRENCY

CROSS-REFERENCE TO RELATED APPLICATIONS

None.

BACKGROUND OF THE INVENTION

1. Field of the Invention

The field of the invention is in telecommunications, particularly broadcast message transmission of a plurality of messages.

2. Related Art

Certain organizations, for example school districts and youth sports leagues, frequently need to send a single message to a plurality of receivers. Such messages may include emergency notices, for example weather related problems like hurricanes. Certain other messages may be non-emergencies but time sensitive nonetheless, such as a scheduling change for a little league game. In order to send such broadcast messages, products and services have been developed for the relevant organizations, such as those offered by the applicant herein, Groupcast LLC.

Some broadcast messaging services send telephone messages in the form of a voicemail through the traditional publicly switched telephone network ("PSTN"). Other services may offer voicemail services through the voice over internet protocol ("VOIP"). Both access the cellular telephone network. Message broadcasting is also made by email and texting. In any of these cases, certain hardware structures and standardized protocols must be used and are unavoidable to broadcast messages at all.

User organizations that send the broadcast messages bear the burden of keeping current the lists of participants to be contacted when a message is broadcast, and their contact information including telephone numbers and email addresses. As participants and their contact information change, the user organization must enter that data in their own data bases of call lists resident in the organizations' computers. The state of the art has been that for broadcast messaging services, the user organization had to enter the same data a second time in the call list database resident in the computers of the broadcast messaging service.

SUMMARY OF THE INVENTION

In a broadcast messaging system, a synchronization and update apparatus of the present invention updates the content of a call list stored in a first database in a first format and a first configuration without upload instructions by a user of a user processor and without accessing said first database by the user of the second processor. The first database is in operative communication with a broadcast server. The broadcast server is programmed to broadcast a message through a communications network to a plurality of message receivers on the call list of organization participants. The user processor is in operative communication with a broadcast server, the synchronization and update apparatus is programmed to update the call list in the first database at the broadcast server from updated call list content in a second database at the user processor. The call list in the second database may be in a second configuration and either in the first format or a second format. The updating is executable automatically and repeatedly after only entry of at least one configuration instruction for at least one call list column.

After the configuration instruction is entered in the synchronization and update apparatus, changes made to the content of the call list in the second database at the user processor are made in the call list in the first database at the broadcast server by the synchronization and update apparatus without further input.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

FIG. 3 is a screenshot depicting a typical organization call list.

DETAILED DESCRIPTION OF INVENTION

Figure 1:
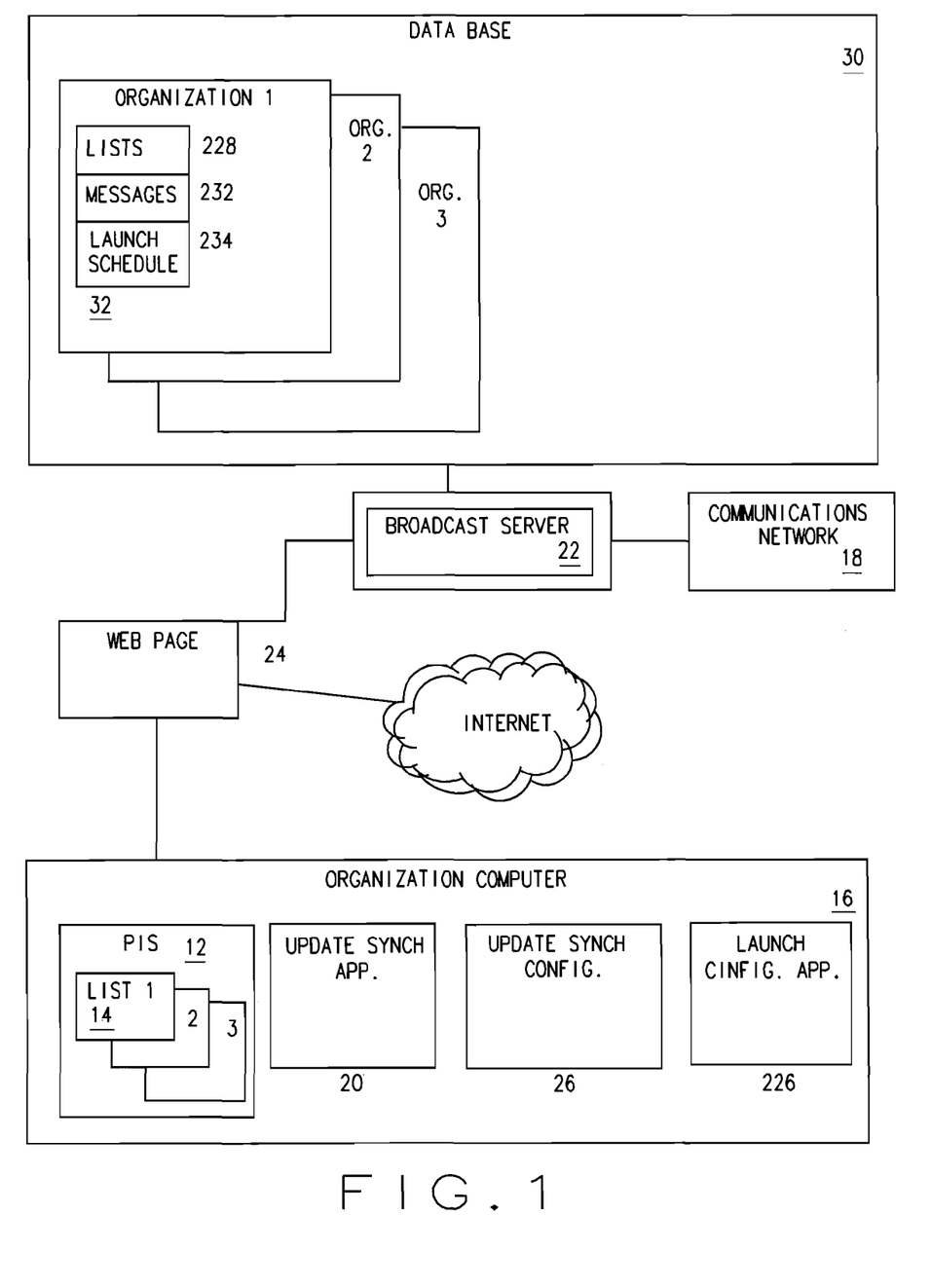
FIG. 1 is a block diagram of the components of the system of the present invention.
Figure 2:
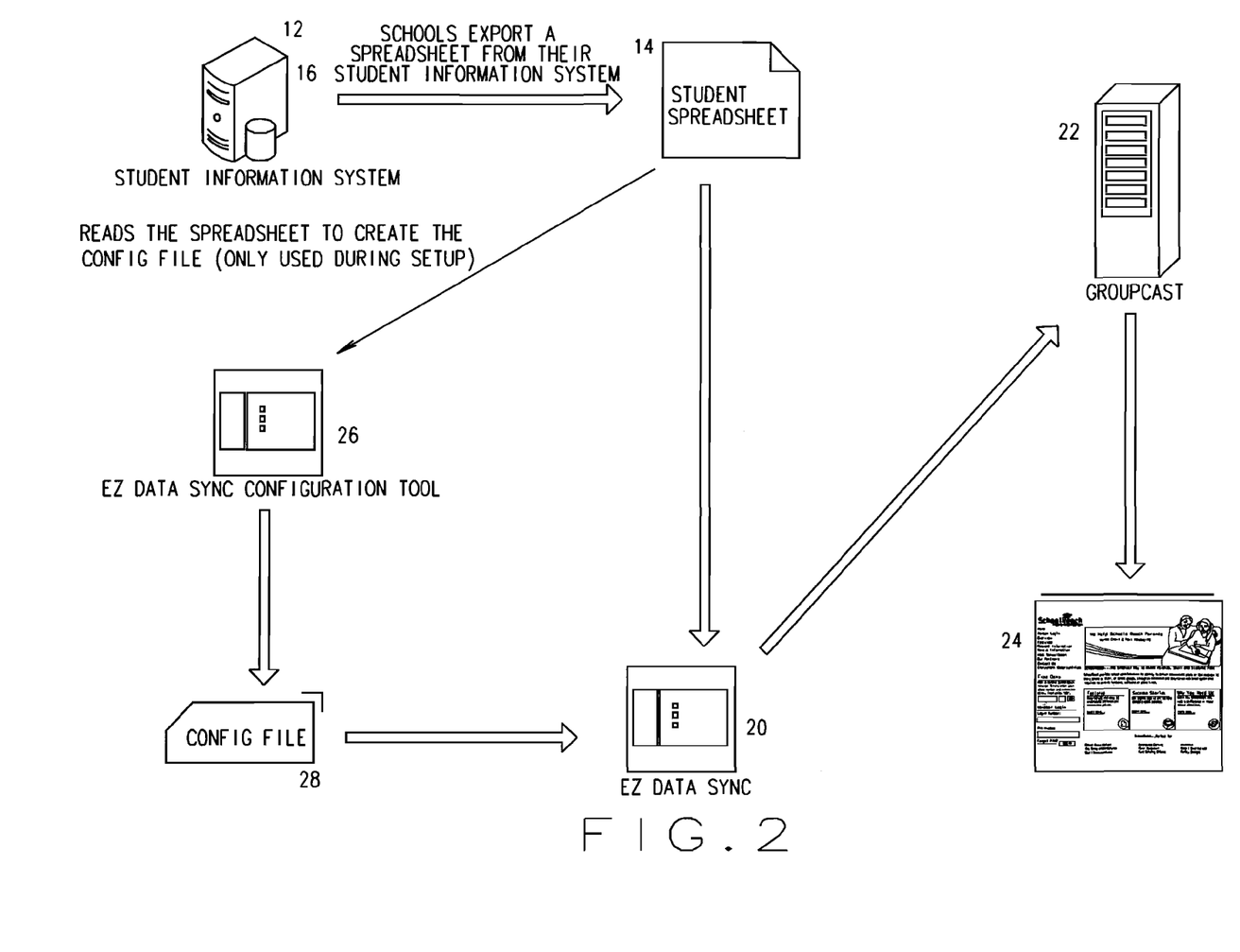
FIG. 2 is a flowchart depicting the synchronization application.

Referring now to the drawings wherein like reference numerals refer to like elements, FIG. 1 is a block diagram of the components of the system of the present invention. A broadcast server 22 is in operative communication with a communications network 18 such as the PSTN, a cellular network and/or the Internet, which network connects to the participants in an organization to be served with broadcast messaging. The organization being served, such as a school district, will have a list of names and phone numbers for the students and their parents, or whatever the relevant participants in the organization may be. This data base will be referred to herein as the participant information system or "PIS" 12. The PIS 12 will be housed on the organization's computer(s) 16. The PIS may be in any of a plurality of formats, many of them familiar such as for example spreadsheets 14 in Excel format. An organization may have multiple spreadsheets, as for example with students attending different schools within a single district, or subgroups for example students in a particular grade. As seen in FIG. 1, the PIS 12 will have a plurality of participant spreadsheets 14, each of which enumerates the names, telephone numbers and/or email addresses and optional additional information regarding each of the relevant participants.

The system of the present invention will include a computer programmed to send particular messages in a broadcast format to all participants on a particular spreadsheet 14. A computer programmed to execute this will include the broadcast server 22. The broadcast server 22 will also be programmed to maintain a webpage 24 on the Internet. By accessing the webpage 24, an organization can provide a message and request that it be sent in broadcast format to all participants on a list of participants 14 entered on the webpage 24 by the organization. The PIS 12, list spreadsheets 14, broadcast server 22 and webpage 24 existed in the prior art.

In the present invention, a call list update synchronization component 26, automatic list update synchronization application 20 and launch configuration application 226 are added to the organization's computer 16.

On a regular basis, participating organizations need to change their participant spreadsheets 14, such as the call list depicted in FIG. 3. Participants' telephone numbers change, participants change and participants may change categories or change membership to additional or different groups. In the prior art, the computer programmed to execute such changes was the server 22 or another broadcast service processer in operative communication with server 22. As a result, an organization wishing to enter changes for participants to receive messages had to do so through the webpage 24 in order for that information to be accessible to server 22 when a signal was received to broadcast a message to participants on a list. The present invention includes a software application for automatic synchronization of call list updates, synchronization application 20, that resides on the organization's computer 16 where the PIS 12 is loaded.

The synchronization application 20 includes a configuration tool 26. Within the configuration tool, an organization may enter the format of a particular spreadsheet of participants into the configuration tool and use it to list the names of participants, their phone numbers, and other relevant information in a format receivable by the server 22. At least one field will be provided for the organization to enter information relevant to a particular participant, such as for example the participants involvement in a particular program such as a club or in a sports team. Another field may include the telecommunications company offering the service through which the participant receives phone service, either by landline or wireless.

Figure 4:
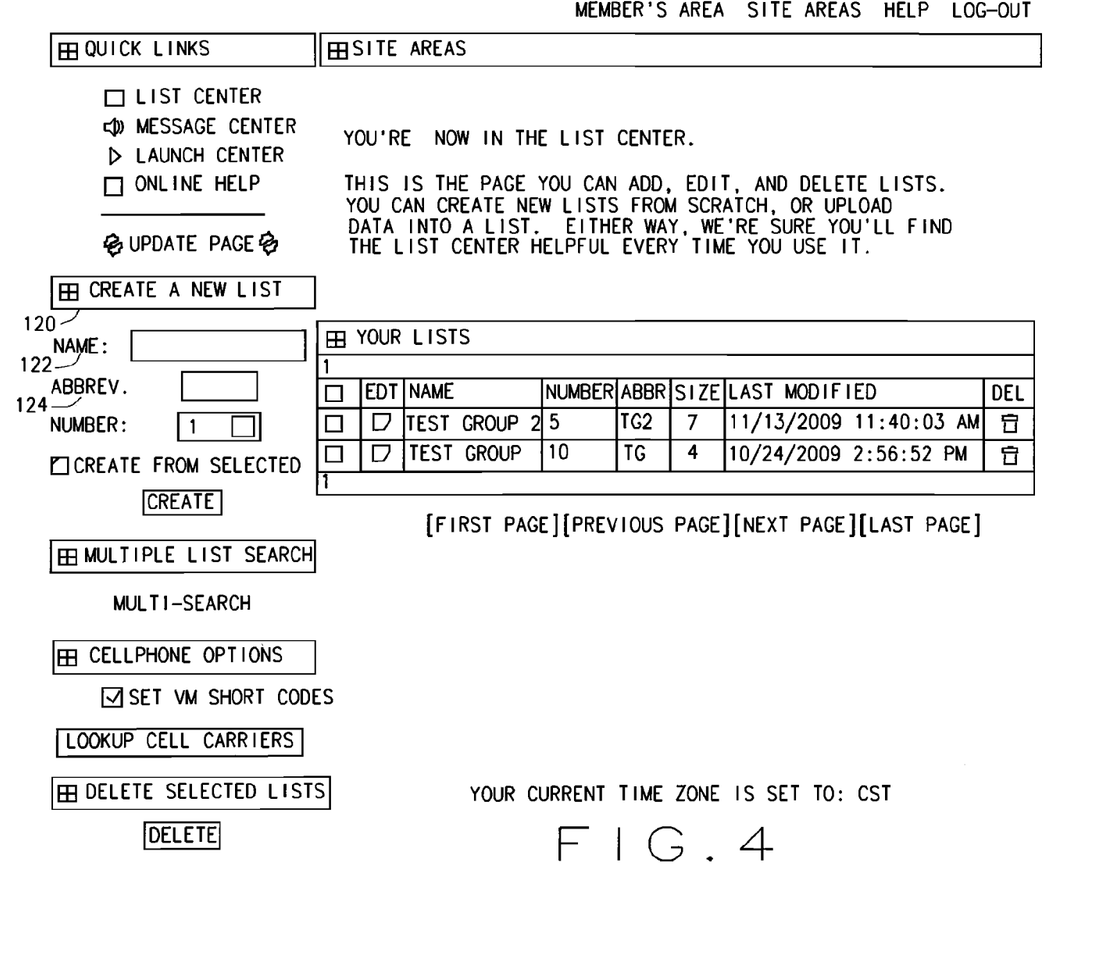
FIG. 4 is a screenshot depicting the synchronization process.

In operation, the organization personnel access the configuration tool 26 from the organization computer 16, usually the same computer where the PIS 12 resides. The spreadsheet information 14 is entered into the configuration tool 26 which creates a configured file 28. When the file is complete, the organization personnel upload the configured file through the synchronization application 20. Upload may be through the web page 24. The synchronization application 20 thereafter establishes an operative communication between the organization's computer 16 and the broadcast server 22 and the configuration file 28 is transferred to the broadcast server 22 where it may be accessed through webpage 24, such as depicted in FIG. 4.

In operation, a list is maintained by a user of the system of the present invention. The list 100 will have multiple fields, including at least a list of first names 102, last names 104, first phone numbers 106, possible second phone numbers 108, and optional fields such as class grades 110 and activities 112.

In order to enable the system of the prevent invention, at least one list must be configured by the user. A first list may be created at the create page on a web site embodying the present invention 120. The list will be named 122 and an abbreviation assigned 124.

Figure 5:
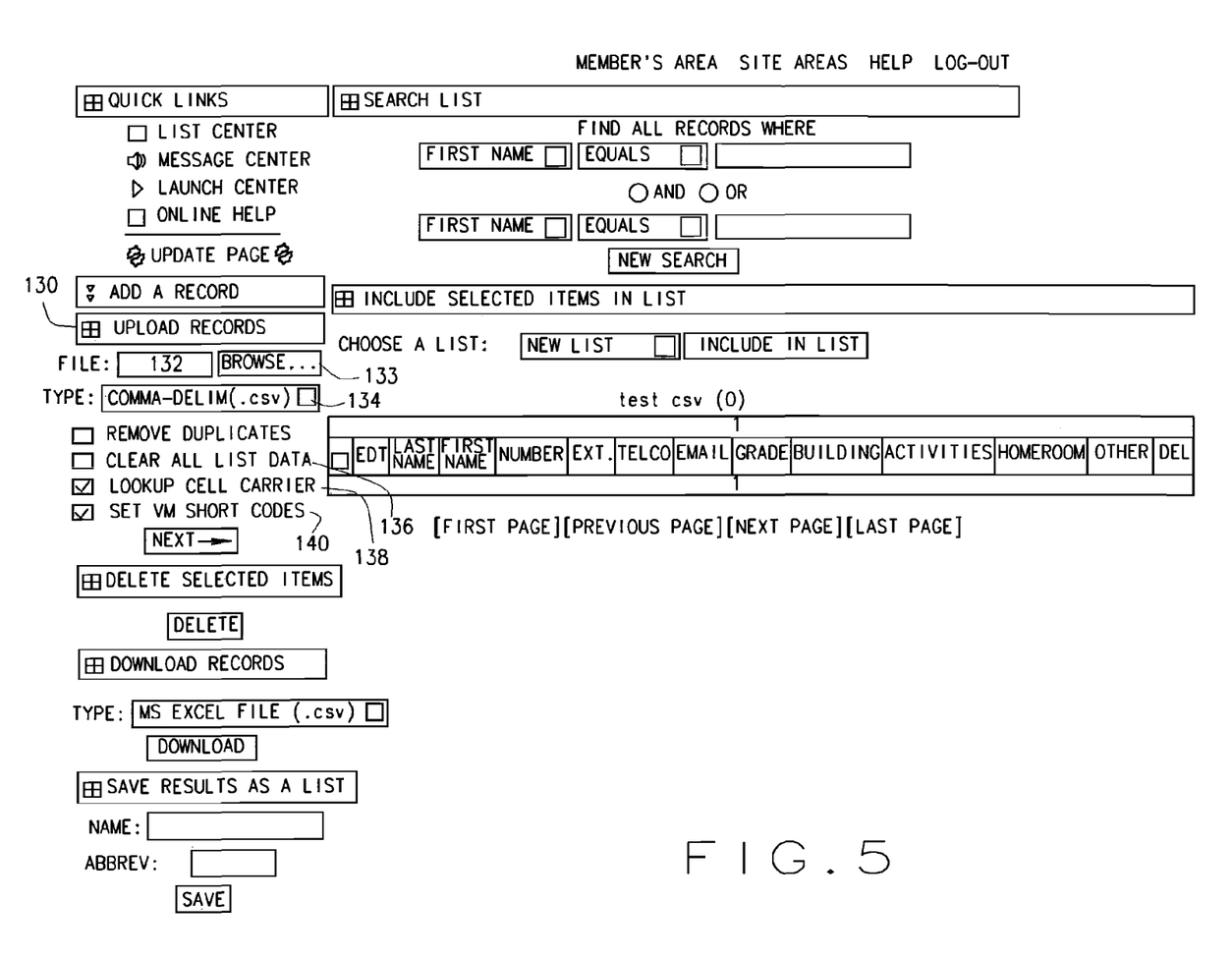
FIG. 5 is a screenshot depicting the synchronization process.

In FIG. 5, an upload records tab 130 may be accessed. Within that page, the file to be uploaded must be configured. Hence, the file must be identified by file name at field 132. This may be executed using the browse button 133 that displays call list files resident on the organization's computer. Selecting and opening from the display populates field 132 with the selected file. Common application formats in which lists are maintained include ".csv," ".txt" and ".exl", although other applications in which lists may be maintained are within the scope of the present invention. A ".csv" file is used as an example herein. Such files have their columns delimited in varying manners, such as by a comma or a tab. A drop-down menu 134 is provided so that a user can indicate the proper column delimitation format by naming the call list application, e.g., .csv. Other column delimiting formats and/or delimitation instruction methods are within the scope of the present invention. The present invention advantageously receives call list content from any application, saved in any format, and does not require organizations to maintain their call lists in dedicated software.

Updating with the synchronization application can be enabled with various options, including clearing all list data 136 at each update, in order to avoid duplication of entries. A feature providing for a look-up of cellular telephone service carriers 138 may be provided. A look-up of a voice mail short codes 140 may be provided. This latter feature discovers the short code or barge ahead codes for the appropriate cell phone service provider so that outgoing greeting messages on automated cellular telephone service voice mail systems may be skipped, in order to speed message delivery and avoid cut off messages. The disclosure of co-pending application Ser. No. 12/627,854 is incorporated by reference herein.

Figure 6:
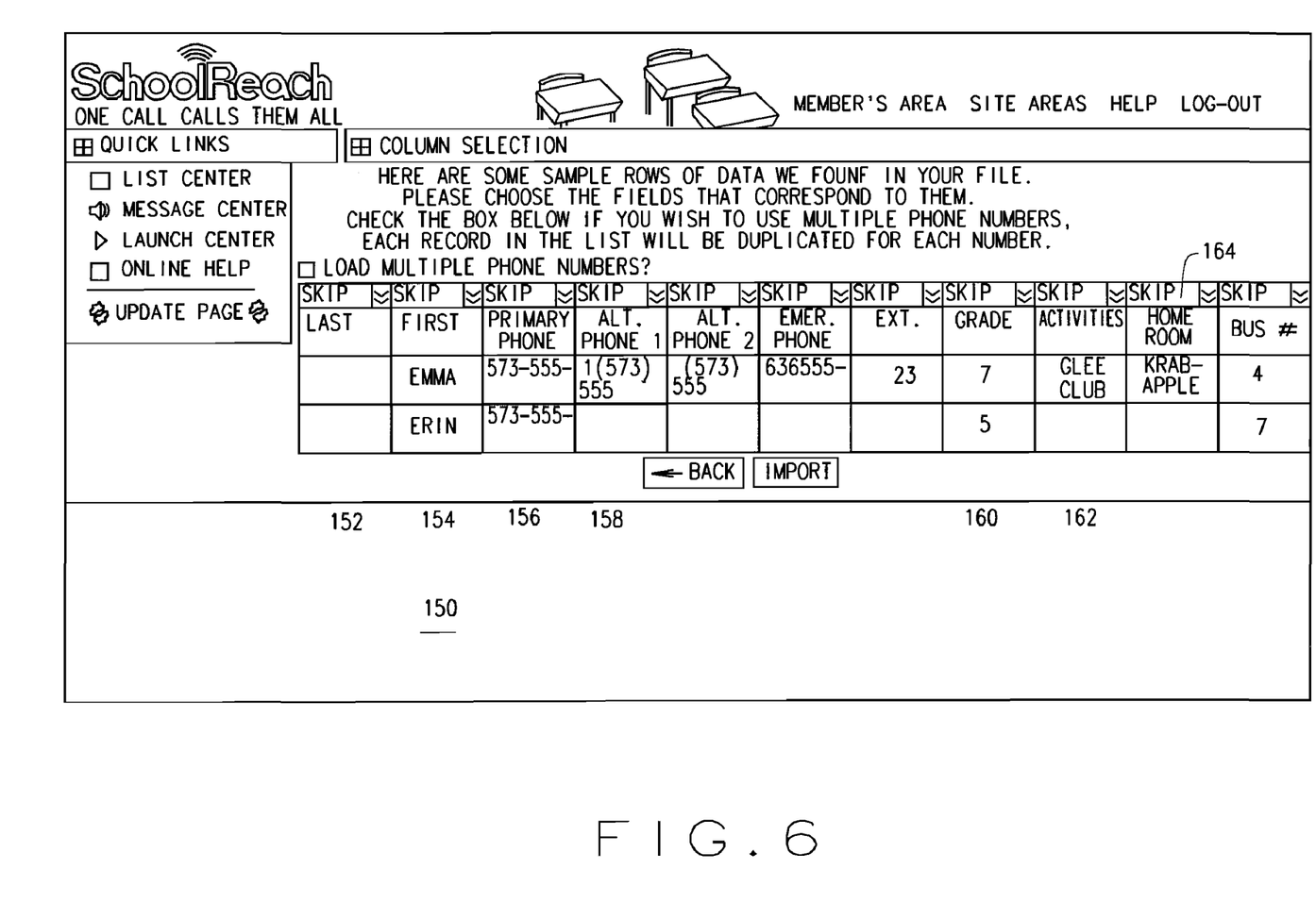
FIG. 6 is a screenshot depicting the synchronization process.

Once a file has been identified and options selected in steps 130 through 140, the file itself is loaded into the configuration window 150, shown in FIG. 6. Each column of the list is displayed in association with a separate drop-down menu for that column. The drop down menu's options comprise a list of column headings that may be selected by the user organization. These may include a last name column 152, a first name column 154, a telephone number column 156, an optional alternate telephone column 158, and any of a number of optional fields that the list may be configured to include at the user's selection, as for example the grade 160 or activities 162. An email column may be included. A final selection on the drop-down menus is "skip" 164. Selecting skip on a particular column is an instruction to the configuration application that the skipped column and its contents will not appear on the uploaded update version of that list that the synchronization application will forward to the broadcast server 22. The synchronization application advantageously can receive call list content from its original column configuration, and does not require organization users to enter each row of content into a required column configuration for the broadcast server database. The columns as configured and/or delimited by the synchronization application or its configuration tool may be any width, and may be any in order.

Figure 7:
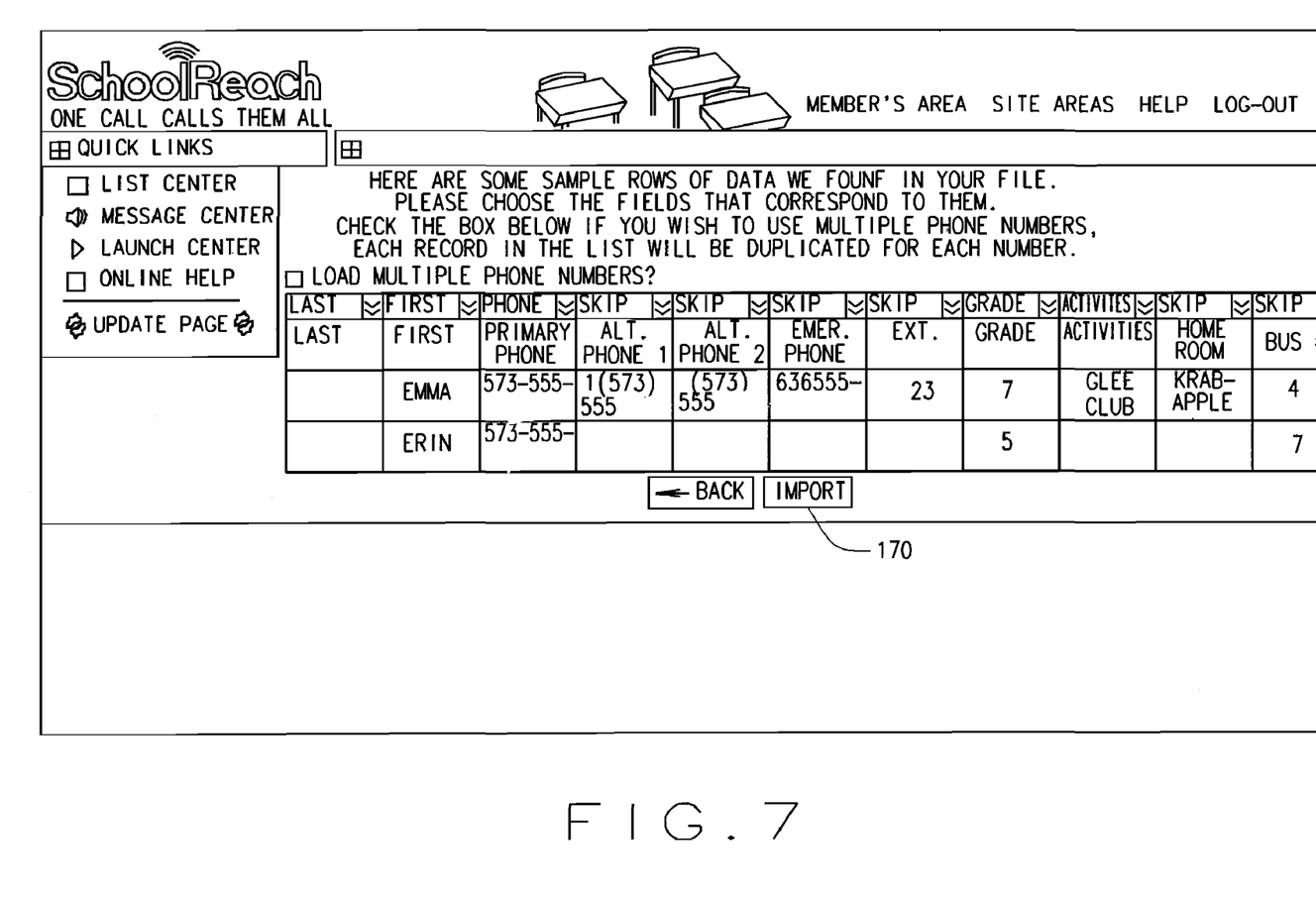
FIG. 7 is a screenshot depicting the synchronization process.

Having configured the columns, the user may simply select import 170 (FIG. 7) and the configuration of that individual list will be stored by the synchronization application on the user's computer and similarly stored in an associated memory in the broadcast messaging center's server 22.

Figure 8:
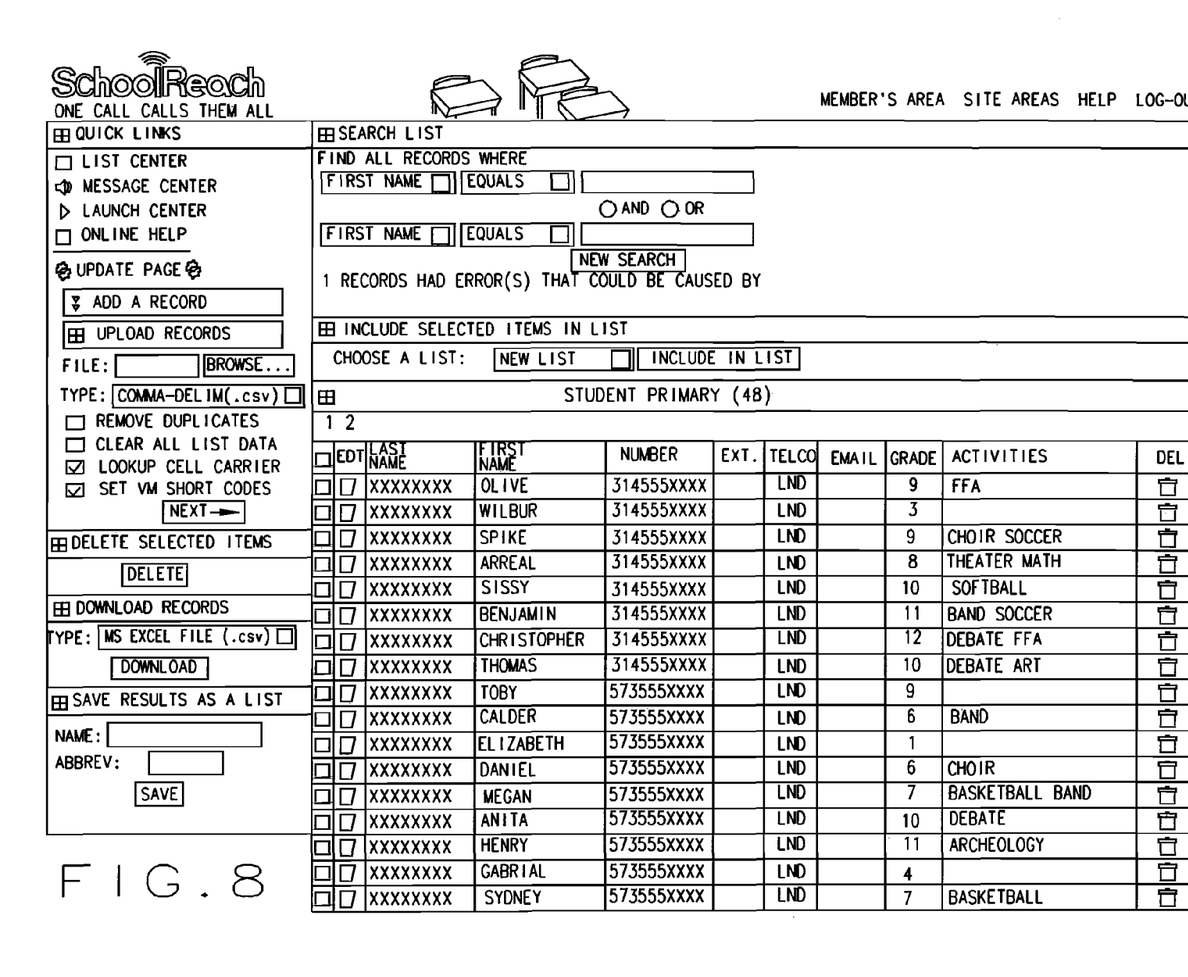
FIG. 8 is a screenshot depicting the synchronization process.

Once the configuration has been made and saved, the synchronization application may upload the designated list with the current content information at user selectable intervals, such as daily. This will yield a call list such as seen on FIG. 8 that is available for execution of a message broadcast. This configured call list content is saved at the broadcast server database 32, 228, as tables in a relational database recallable for executing broadcast messages in the depicted embodiment by an SQL query.

Figure 9:
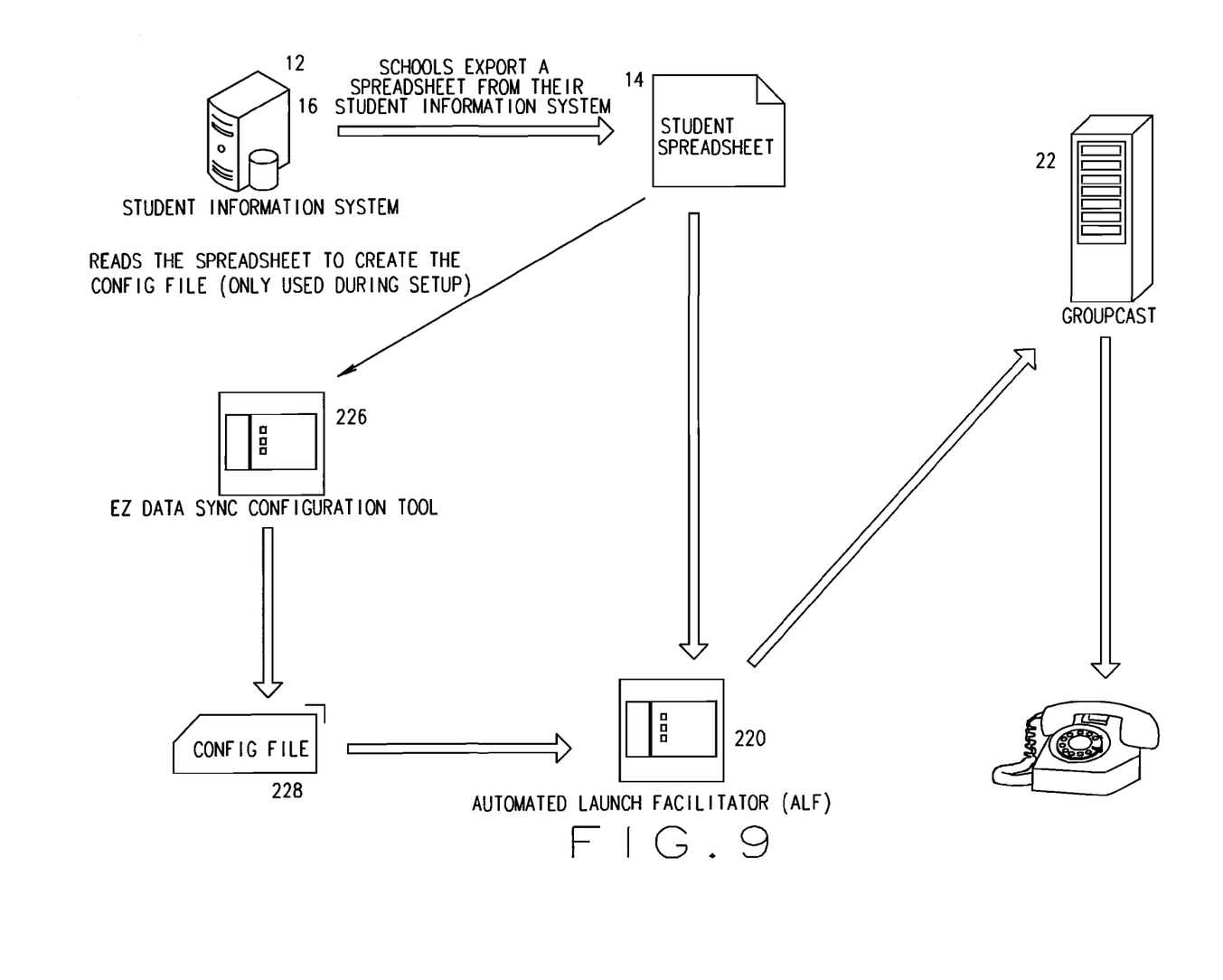
FIG. 9 is a flowchart depicting the automated launch facilitator system

FIG. 9 depicts a message launch configuration system. It includes as before the organization's computer 16 on which resides a PIS 12 containing at least one participant call list spreadsheet 14.

The broadcast server 22 will have a database 30 organized into separate memories 32 for each organization served. The separate organization memories 32 will house at least one call list 228 as configured by the process described above and a library of messages pre-recorded by that organization 232. A launch configuration tool 226 is used by the organization to create a configured launch file 228. A launch facilitator application 220 enters the configured launch file 228 into the organization memory 32, thereby populating the memory 32 with a configured message, 232 and configured launch schedule 234 which, along with the previously configured call list 228 enable the launch of a broadcast message.

Figure 10:
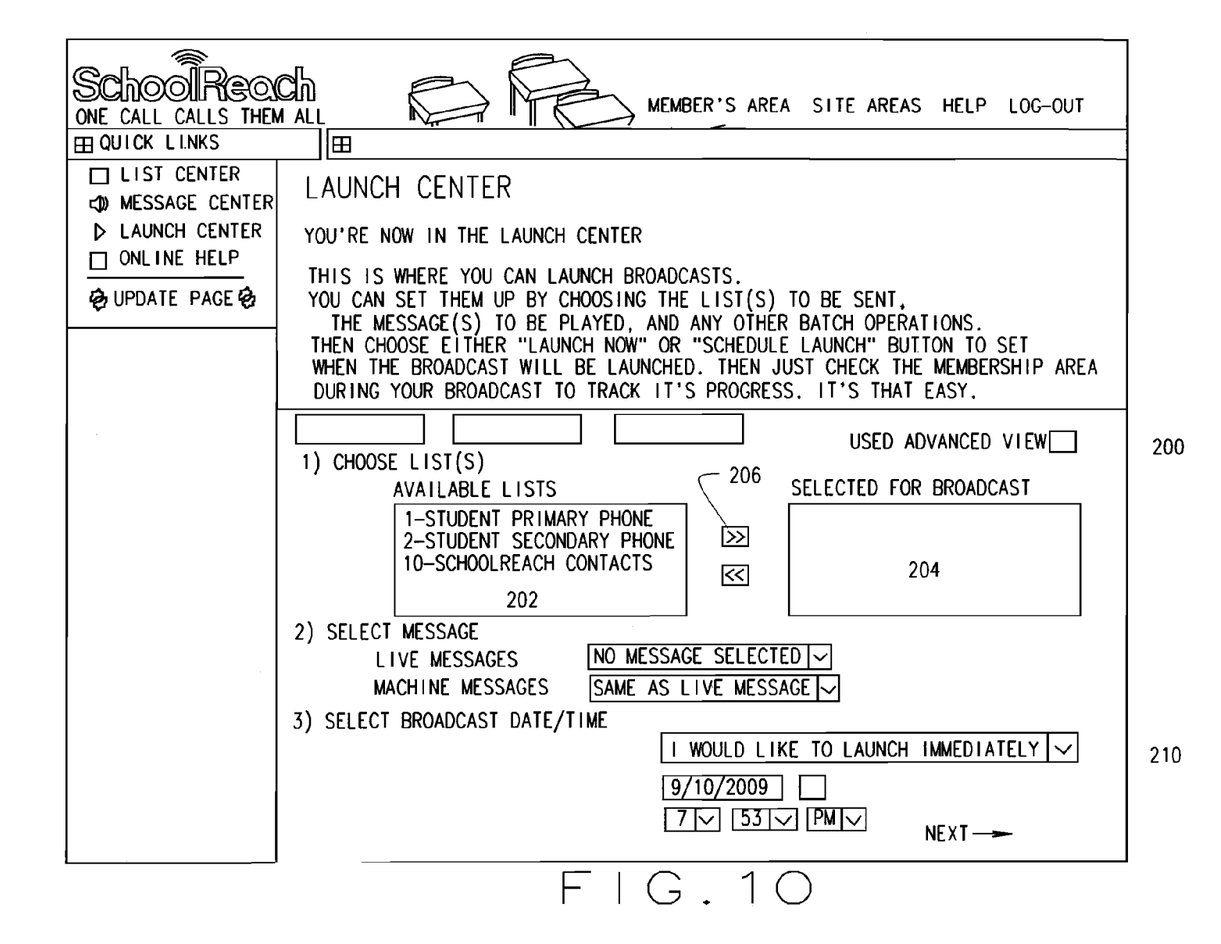
FIG. 10 is a screenshot depicting the automated launch facilitator system.

In order to broadcast a message, a "launch" window 200 may be selected, FIG. 10, which will allow configuration of a broadcast message for launching. Configuration includes selecting who to call, what message to deliver and when. Available call lists are displayed in field 202. Lists can be highlighted in the available lists field 202 and selected for broadcast by moving them to field 204 with selection and de-selection buttons 206. Drop-down menus 208 are used to indicate a message to be sent. The drop down menu is a list of previously recorded messages. These may be previously submitted individual messages recorded during a call from the broadcast server to a person at the organization who speaks the message. These messages may also include whole or partial messages comprised of text to voice audio. Text to audio messages are useful in situation like attendance reporting for schools. If a student has missed a class, no one has to record that message. The students name is audiblized by the text to voice application and that audiblization is entered into a message that appears as one of the messages in the drop down menu 208.

Figure 11:
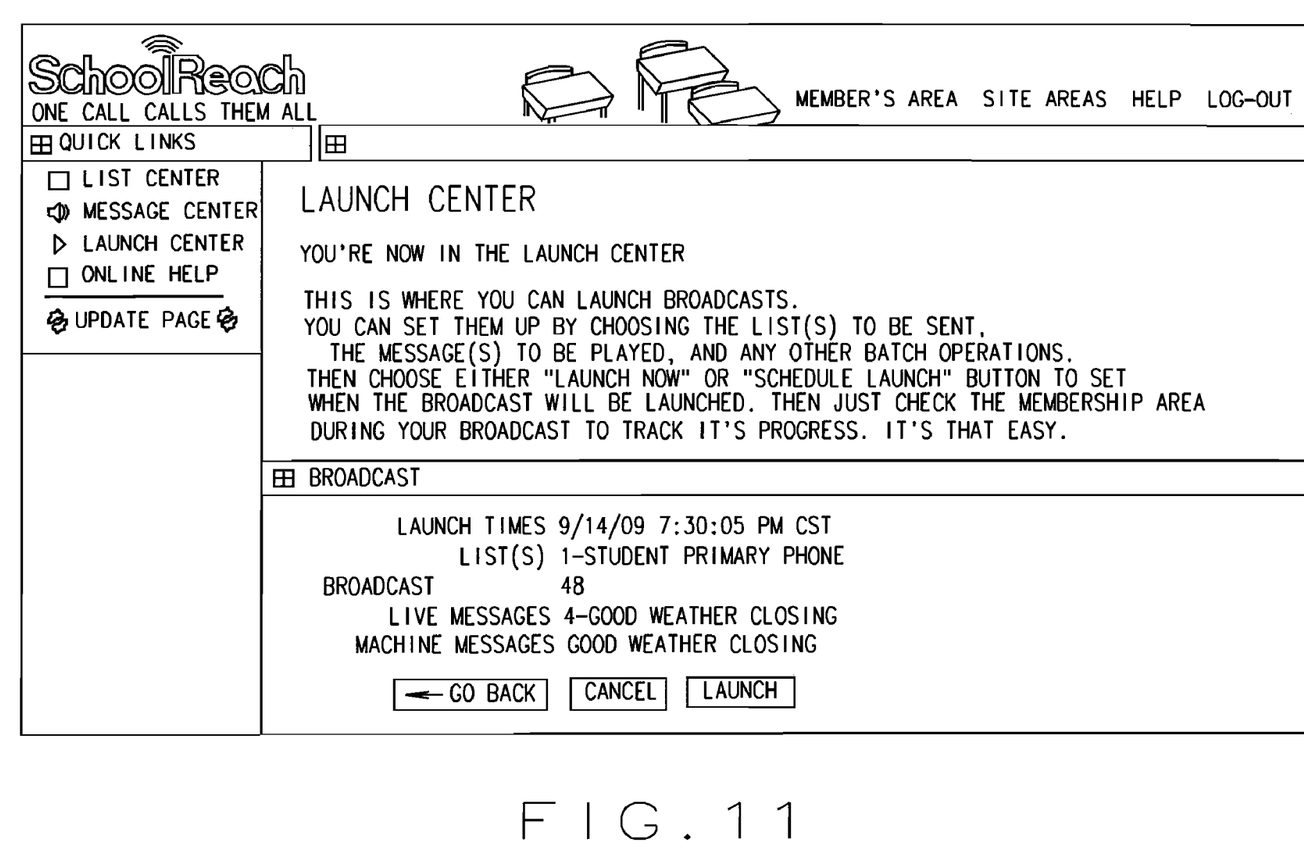
FIG. 11 is a screenshot depicting the automated launch facilitator system.

A further drop-down menu 210 is used to indicate when a message will be broadcast, either immediately or at a scheduled time, using a provided calendar and time indicator. Once the who, what and when information is configured, the user organization need only click the "launch" button. Hence the broadcast server website need not be accessed for each launch. For example, attendance messages may be sent after each hour without the organization visiting the website every hour. A final step is depicted in FIG. 11, where the configured information is confirmed by display and automatic launch of a broadcast message is launched with a single click.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. In a broadcast messaging system, a synchronization and update apparatus comprising:

a first database storing a call list in a first format and a first configuration;

said first database being in operative communication with a processor, said processor being programmed to broadcast a message through a communications network to a plurality of message receivers on the call list;

a second processor, said second processor being in operative communication with said first processor, said second processor being programmed as a synchronization apparatus to synchronize the call list in said first database from updated call list content in a second database, the call list in said second database being in a second configuration and either in said first format or a second format;

said synchronization being executable after only entry of at least one configuration instruction for at least one call list column;

whereby, after said configuration instruction, changes made to the content of the call list in the second database are made in the call list in said first database without upload instructions by a user of said second processor and without accessing said first database by a user of said second processor.

2. The synchronization apparatus of claim 1 further comprising a webpage on the Internet, said configuration instruction being entered on said web page.

3. The synchronization apparatus of claim 1 further comprising a configuration tool, said configuration tool being programmed to receive and apply said configuration instruction.

4. The synchronization apparatus of claim 1 further comprising a configured file, said configured file being created upon entry of said configuration instruction, said synchronization being by uploading said configuration file to said first database.

5. The synchronization apparatus of claim 4 further comprising said configured file being created by said configuration tool.

6. The synchronization apparatus of claim 4 further comprising said configured file being be accessible through said webpage.

7. The synchronization apparatus of claim 4 further comprising said configured file having a field including at least one of a first name, a last name, a first phone number, a second phone number, a the telecommunications company, an email address and an optional field.

8. The synchronization apparatus of claim 1 further comprising said first format being comprised of at least one of a .csv, a .txt and an .exl application.

9. The synchronization apparatus of claim 3 further comprising said configuration tool delimiting columns.

10. The synchronization apparatus of claim 9 further comprising said configuration tool delimiting columns in any width and in any order regardless of a column width or a column order in said first configuration of said call list.

11. The synchronization apparatus of claim 3 further comprising said configuration tool delimiting columns by entering said first format of the call list application.

12. The synchronization apparatus of claim 3 further comprising said configuration tool displaying a drop-down menu for each column of the call list being configured from said first database, said drop down menu's options comprising a list of column headings that may be selected by a user organization.

13. The synchronization apparatus of claim 1 further comprising said at least one configuration instruction including at least one of an instruction to clear all list data at said synchronization, an instruction to look-up a cellular telephone service carrier and an instruction to look-up a voice mail short code.

14. The synchronization apparatus of claim 12 further comprising said drop down menu having a skip option, said skip option for a particular column being an instruction to the configuration tool that the skipped column and a content thereof will not appear on the synchronized version of that call list forwarded to said first database.

15. The synchronization apparatus of claim 3 further comprising said configuration tool not requiring an organization user to enter each row of call list content into a required column configuration for said synchronization with said first database.

16. The synchronization apparatus of claim 1 further comprising said first database being a relational database recallable for executing a broadcast message by an SQL query.

17. The synchronization apparatus of claim 1 further comprising a launch facilitator application, said launch facilitator application entering a configured launch file into an organization memory with a configured message and a configured launch schedule, said configured message and said configured launch schedule along with a previously configured call list enabling a launch of a broadcast message.

18. The synchronization apparatus of claim 1 further comprising an upload records tab and a browse button.

19. In a broadcast messaging system, a synchronization system comprising:
   a first database storing a call list in a first format and a first configuration;
   said first database being in operative communication with a processor, said processor being programmed to broadcast a message through a communications network to a plurality of message receivers on the call list;
   a second processor, said second processor being in operative communication with said first processor, said second processor being programmed as a synchronization apparatus to synchronize the call list in said first database from updated call list content in a second database, the call list in said second database being in a second configuration and either in said first format or a second format;
   a configuration tool, said configuration tool being programmed to receive and apply said configuration instruction;
   said configuration tool displaying a drop-down menu for each column of the call list being configured from said first database, said drop down menu's options comprising a list of column headings that may be selected by a user organization;
   said drop down menu having a skip option, said skip option for a particular column being an instruction to the configuration tool that the skipped column and a content thereof will not appear on the synchronized version of that call list forwarded to said first database;
   a configured file, said configured file being created by said configuration tool upon entry of said configuration instruction, said synchronization being by uploading said configuration file to said first database;
   a webpage on the Internet, said configuration instruction being entered on said web page through operative communication between said web page and said first and second processors;
   said synchronization being executable after only entry of at least one configuration instruction for at least one call list column;
   whereby, after said configuration instruction, changes made to the content of the call list in the second database are made in the call list in said first database without upload instructions by a user of said second processor and without accessing said first database by a user of said second processor.

* * * * *